United States Patent [19]

Kent

[11] Patent Number: 5,263,808
[45] Date of Patent: Nov. 23, 1993

[54] AUTOMATIC STORAGE LATCH SYSTEM FOR A CARGO PLATFORM

[75] Inventor: Douglas H. Kent, Mariemont, Ohio

[73] Assignee: Leyman Manufacturing Corp., Cincinnati, Ohio

[21] Appl. No.: 799,069

[22] Filed: Nov. 27, 1991

[51] Int. Cl.$^5$ .............................................. B60P 1/46
[52] U.S. Cl. ...................................... 414/545; 414/786
[58] Field of Search ............... 414/539, 540, 545, 786; 187/9 R; 298/23 A, 23 B

[56] References Cited

U.S. PATENT DOCUMENTS

| | | | |
|---|---|---|---|
| 3,035,720 | 5/1962 | Selzer | 414/545 |
| 3,275,170 | 9/1966 | MacRae et al. | 414/545 |
| 3,613,917 | 10/1971 | Fowler, Jr. | 414/540 |
| 3,734,239 | 5/1973 | Martin et al. | 414/545 X |
| 3,791,541 | 2/1974 | Himes | 414/545 |
| 3,800,915 | 4/1974 | Himes . | |
| 3,804,276 | 4/1974 | Himes | 414/545 |
| 4,087,007 | 5/1978 | Drews | 414/545 |
| 4,529,351 | 7/1985 | Olins | 414/545 |
| 4,563,121 | 1/1986 | Drews | 414/545 |
| 4,576,541 | 3/1986 | Dunn | 414/545 |
| 4,579,503 | 4/1986 | Disque | 414/558 |
| 4,806,062 | 2/1989 | Stier | 414/545 |
| 5,122,026 | 6/1992 | Kent | 414/545 |

FOREIGN PATENT DOCUMENTS

2121376 12/1983 United Kingdom ............... 414/540

Primary Examiner—Michael S. Huppert
Assistant Examiner—James Keenan
Attorney, Agent, or Firm—Wood, Herron & Evans

[57] ABSTRACT

A cargo platform system particularly structured for use with, e.g., a truck body's cargo opening. The system includes a mast assembly with a mast guide and a mast movably supported by the guide, the mast assembly being fixed to the truck body. A cargo platform is pivotally connected to the mast, the platform being swingable relative to the mast between a horizontal elevator position and a vertical storage position. An automatic latch system partially carried by the mast guide and partially carried by the platform allows the platform and mast guide to be latched together so that substantially no relative movement is possible between the platform and the mast guide in each of an upper latch position when the platform is in its storage position at an upper storage location relative to ground, and a lower latch position where the platform is in its storage position at a lower storage location relative to ground, the latch system functioning so that the platform is automatically latched to the mast guide in each of the upper and lower latch positions in response to movement of the platform into each of the upper and lower storage locations, respectively.

24 Claims, 4 Drawing Sheets

AUTOMATIC STORAGE LATCH SYSTEM FOR A CARGO PLATFORM

This invention relates to cargo platform systems. More particularly, this invention relates to a cargo platform system with a cargo platform that has an automatic latch system for the cargo platform in its storage orientation.

Cargo platforms that are operable as elevators, and that are storable somewhere about a truck's cargo body so as to be movable with the truck, are well known in the prior art. Generally, such cargo platforms are mounted in combination with a special elevating and storing mechanism that is supported by, i.e., fixed to, the sides and/or bed of the truck's cargo body. When a cargo platform, in combination with the combined elevating and storing mechanism, is used as an elevator, the cargo platform is first moved from its storage position to its horizontal or cargo handling position. Once in the horizontal position, the platform may be moved up and down between the bed or floor of the truck and ground level or a loading dock. Such elevator-like movement allows quick, efficient loading and unloading of the truck's cargo space by providing lift means with which the platform is moved to a first loading level for easy transferal of the cargo onto the platform and, then, is raised or lowered in a horizontal plane to a second unloading level for easy transferal of the cargo off the platform.

One basic type of cargo platform system that has seen significant commercial success in the marketplace makes use of two mast assemblies, one mounted to each vertical side edge of a truck body's cargo opening. Each mast assembly is comprised of a mast guide and a mast movably supported by that guide. A cargo platform is pivotally connected between the masts adjacent their lower ends, the platform being swingable relative to the masts between its horizontal elevator position and a vertical storage position. A motor mechanism is connected with the masts for moving the masts up and down relative to ground, thereby allowing the cargo platform to operate as an elevator between truck floor and ground when the cargo platform is in its horizontal position. After the truck has been unloaded or onloaded with the cargo platform in the horizontal elevator position, the platform is then translated into the vertical storage position where it is substantially parallel to the truck body's cargo opening. In this platform storage position, the vertical cargo platform is upraised relative to ground level until it is located substantially above the truck's floor level where it, in tailgate. And it has been in this tailgate position that cargo platforms of this type prior art cargo platform system have been stored during the truck's over-the-road travel. A cargo platform system of this general structural type is illustrated in U.S. Pat. No. 4,576,541 entitled Safety Latch For A Cargo Platform.

A truck with a cargo platform system of the type described in the above paragraph may be called upon to make cargo deliveries at different locations that are either close to one another, or relatively far away from one another. In other words, a truck with such a cargo platform system may make a series of deliveries within the same city or town where the delivery sites are relatively close to one another and/or it may make deliveries between different cities and towns where those cities and towns are located relatively far away from one another. Now where delivery sites are located relatively close to one another, and with the type of cargo platform system described above, it is somewhat time consuming to continually store and re-store the vertically disposed cargo platform above the truck body's floor after successive deliveries. In other words, it may be desirable simply to leave the vertically disposed cargo platform in a storage position beneath the truck body's floor when successive delivery sites are relatively close one to another so as to minimize elevator position set up time for the cargo platform at a successive delivery site. On the other hand, when successive delivery sites are relatively far away from one another, and in order to minimize wind resistance and thereby enhance gasoline mileage for the truck, it is desirable to locate the vertically stored cargo platform above the truck body's cargo floor. So in local delivery situations where the distance between delivery sites is relatively short, it may be desirable to store the cargo platform in a first storage location substantially below the truck body's floor where it may be easier for the truck driver to set up the cargo platform for use as an elevator at the successive delivery site. On the other hand, and in over-the-road situations where the distance between delivery sites is significant, in order to minimize wind resistance it is desirable to store the vertically folded cargo platform in a second storage locator substantially above the truck body's floor so as to enhance gasoline mileage for the truck.

A cargo platform system particularly structured for use with a truck body's cargo opening has recently been invented which overcomes the above-noted problems, i.e., which allows the cargo platform to be stored in a first latched position located entirely below the truck body's cargo floor, as well as in a second latched position located substantially above the cargo floor. This earlier invented cargo platform system is particularly disclosed in U.S. application Ser. No. 583,868, filed Sep. 17, 1990, now U.S. Pat. No. 5,122,026 and assigned to the assignee of this case. This earlier cargo platform system, however, requires the mast and mast guide of the system's mast assembly to be manually latched and manually unlatched whether the cargo platform is stored in its upper latched position above the truck body's cargo floor or in its lower latched position below the truck body's floor. In other words, and whenever the cargo platform is stored, this earlier latch system, which involves a latch key and separate, spaced apart keyways, must be manually operated by the truck driver. This manual latch system adds to the time required to store the cargo platform from its elevator position when its use as an elevator is no longer required, as well as to return the cargo platform from its storage position when its use as an elevator is again desired. In other words, the manual latch system in this earlier cargo platform system is not automatic in operation, i.e., the cargo platform is not automatically latched in either its upper storage position above the truck body's cargo floor or in its lower storage position below the truck body's cargo floor. And so this earlier cargo platform system is not as efficient from an operational time standpoint as would be the case if its latch system was automatic in operation.

Accordingly, it has been the primary objective of this invention to provide an improved cargo platform system for use with a cargo floor elevated above ground, e.g., for use with a truck body at the truck body's cargo opening, which is of the type that includes a mast assembly having a vertical mast guide fixed relative to the cargo floor and a mast movably supported by that guide, and that includes a cargo platform pivotally connected to the mast so it is swingable between a horizontal elevator position and a vertical storage position. The cargo platform system of this invention includes an automatic latch system partially carried by the mast guide and partially carried by the platform that allows the platform and mast guide to be automatically latched together so that substantially no relative movement is possible between the platform and the mast guide in each of an upper latch position where the cargo platform is in its storage position at an upper storage position relative to ground, and a lower latch position where the platform is in its storage position at a lower storage location relative to ground, the automatic latch system functioning so that the platform is automatically latched to the mast guide in each of the upper and lower latch positions in response to movement of the platform into each of the upper and lower storage locations, respectively.

It has been another objective of this invention to provide an improved cargo platform system of the type described in the paragraph above where the automatic latch system includes a first latch release located at an upper position relative to ground and a second latch release located at a lower position relative to ground, the cargo platform being releasable from its storage position upon activation of either one of the first and second latch releases whether the cargo platform is stored at its upper or lower storage location.

It has been still a further objective of this invention to provide an improved cargo platform system of the type described two paragraphs above where the automatic latch system is operable with a cargo platform of the type that includes a primary section and a secondary section, the two sections being unfolded in co-planar platform configuration when the cargo platform is oriented in horizontal elevator position, and being folded one on top the other in sandwich configuration when the cargo platform is oriented in vertical storage position. In this environment, the cargo platform system of this invention is directed to an automatic latch system that particularly cooperates with the secondary platform section and which, in preferred form, results in the cargo platform being stored in its vertical folded storage position with the secondary platform section outboard of the primary platform section, thereby causing the primary platform section to be interposed between the secondary platform section and the mast assembly.

Other objectives and advantages of this invention will be more apparent from the following detailed description taken in conjunction with the drawings in which.

Figure 1:
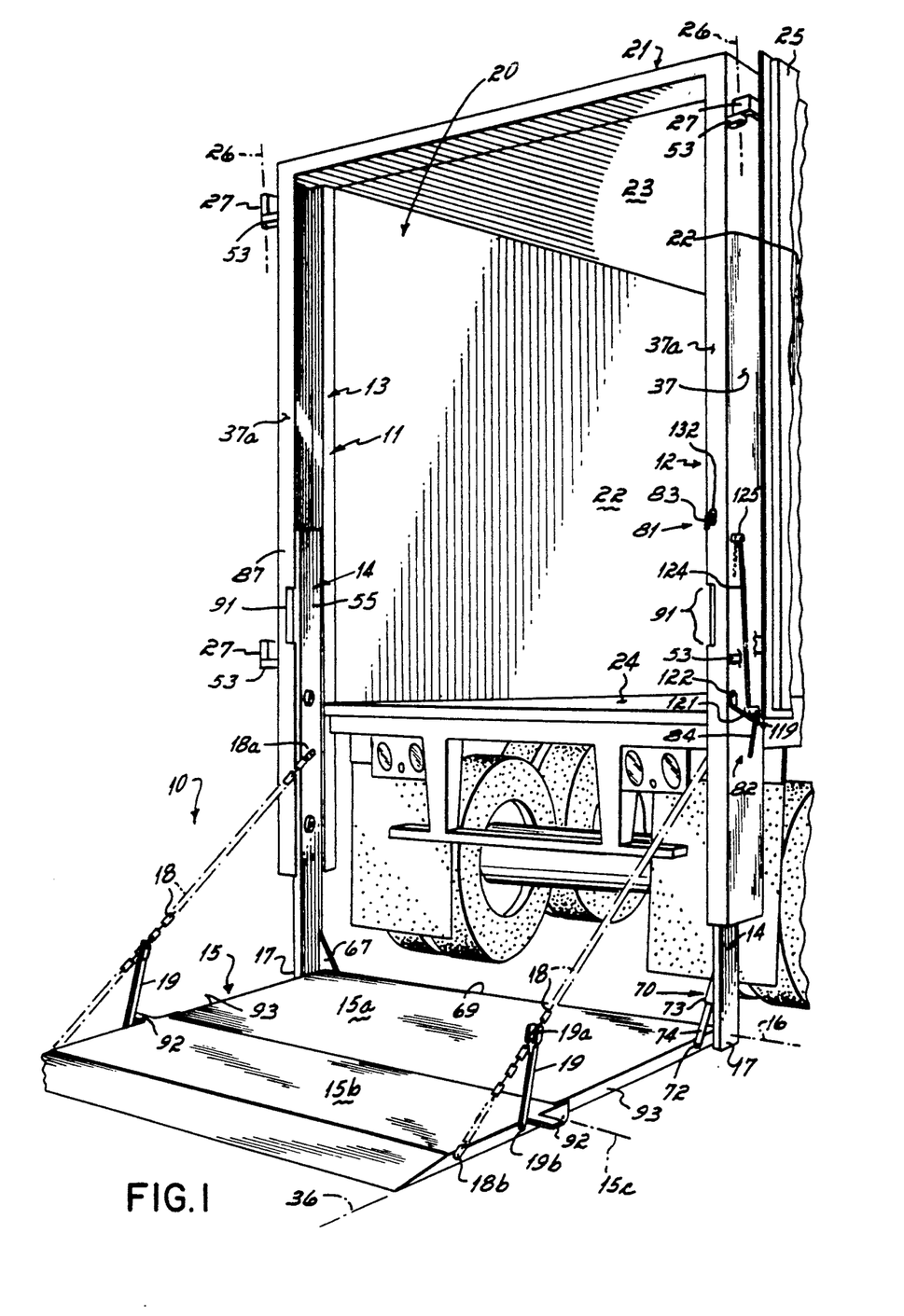
FIG. 1 is a rear perspective view of a cargo platform system in accord with the principles of this invention, the cargo platform being illustrated in horizontal elevator position and at ground level.

The cargo platform system 10 of this invention is attached to the rear cargo opening 20 of a truck body 21, see FIG. 1. The truck body 21 is comprised of opposed side walls 22, ceiling 23 and a cargo floor or bed 24. Opposed doors 25, each disposed on a vertical hinge line 26 and connected by hinges 27 to the truck body 21, open and close the truck body's interior to access for loading and unloading purposes.

Figures 2A, 2B, 2C:
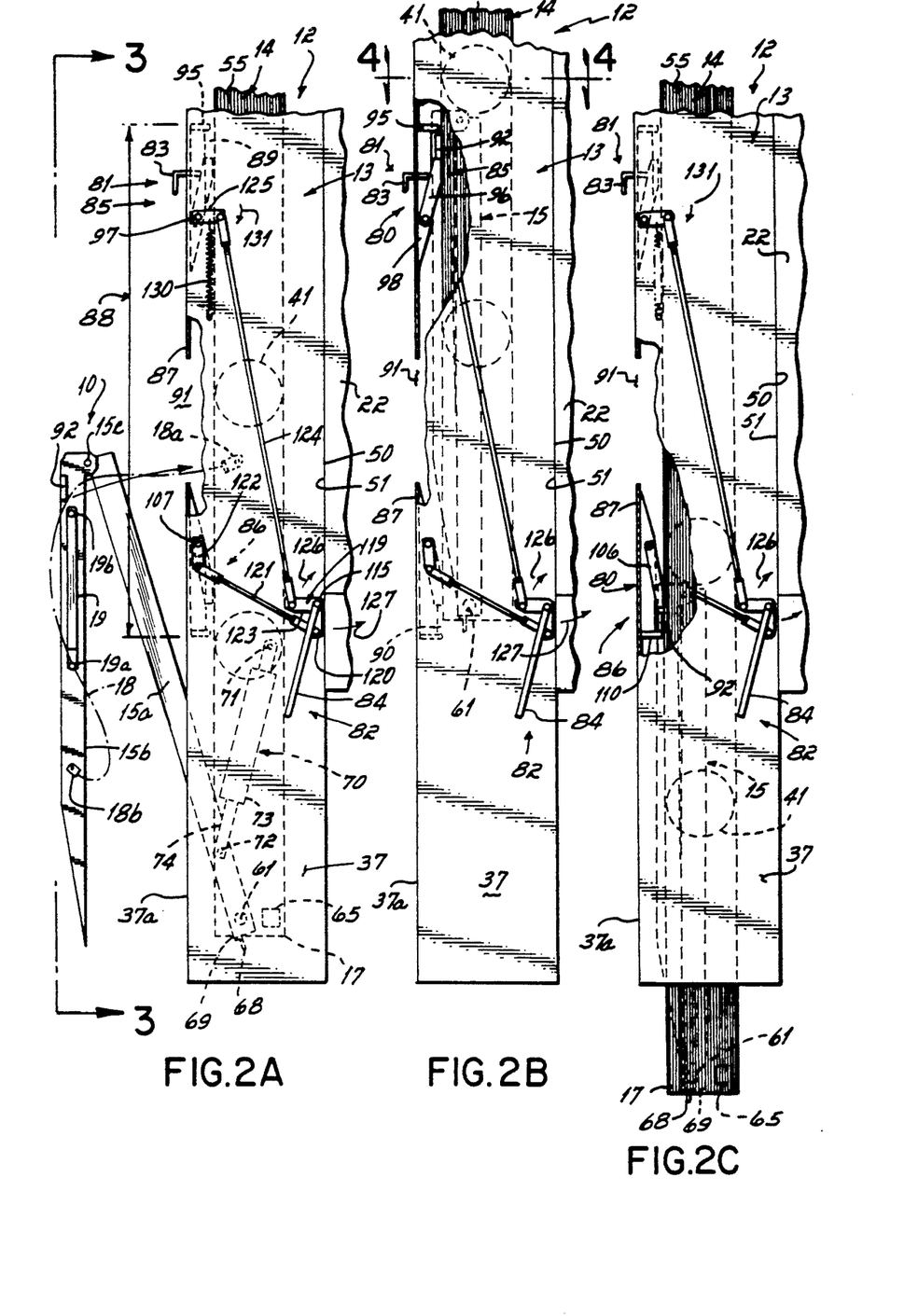
FIG. 2A is an enlarged side elevational view of the cargo platform system with the cargo platform being shown in an intermediate folding/unfolding position.
FIG. 2B is a view similar to FIG. 2A with the cargo platform being shown folded and stored in an upper storage location.
FIG. 2C is a view similar to FIG. 2B but with the cargo platform being shown folded and stored in a lower storage location.

The basic components of the cargo platform system 10 also are illustrated in FIG. 1. The system includes two mast assemblies 11, 12, each of which incorporates a mast guide 13 and a mast 14 movably supported by the mast guide. A foldable cargo platform 15 is pivotally connected on swing axis 16 to the bottom end 17 of each mast 14, the platform being swingable relative to the mast between an unfolded horizontal elevator position illustrated in FIG. and a folded vertical storage position as illustrated in FIGS. 2B and 2C. Opposed chains 18 (each of which is fixed at one end 18a to a mast 14 and at the other end 18b to an adjacent side edge of the cargo platform 15) each cooperate with an arm 19 (which is connected at one end 19a to a chain 18 and pivotally connected at the other end 19b to secondary section 15b) to hold the cargo platform in its horizontal elevator position shown in FIG. 1. An automatic latch system (described below) holds the cargo platform 15 in its folded vertical storage position with the masts 14 when the platform is so oriented as shown in FIGS. 2B and 2C.

Figure 4:
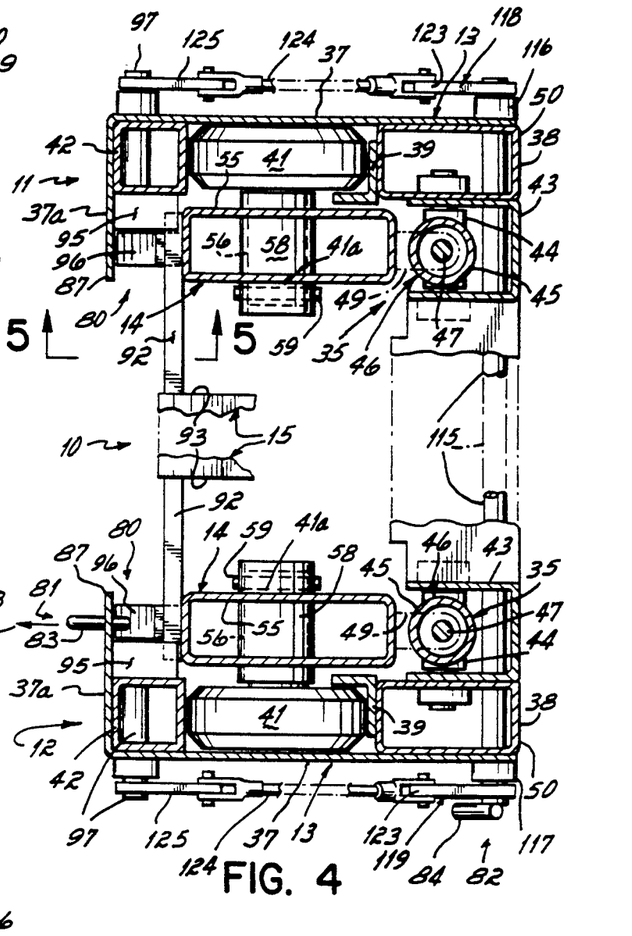
FIG. 4 is a cross-sectional view of the cargo platform system taken along line 4—4 of FIG. 2B.

The mast assemblies 11, 12 of the cargo platform system 10 are particularly illustrated in FIGS. 1 and 4. Each of the mast assemblies 11, 12 is identical one with the other. Each mast assembly 11, 12 includes, as noted, a mast guide 13 and a mast 14 movably supported by that mast guide. A hydraulic motor system 35 (FIG. 4) is connected with each mast 14 for vertically moving that mast up and down relative to the mast guide 13 in order to operate the cargo platform 15 as an elevator between the truck floor 24 and ground 36. The mast guide 13 is comprised of a face plate 37 with a first vertical tubular support post 38 located at one end. A second vertical tubular support post 42 also is fixed to the face plate 37. The first support post 38 mounts a vertical roller track defined by angle piece 39. An opposing roller track is defined by the secondary support post 42. These roller tracks cooperate to define a vertical path for a pair of rollers 41, further described below, which are rotationally journalled as at 41a to the mast 14.

A motor housing 43 of generally U-shaped configuration is fixed to the mast guide's first support post 38 on that post's inside face. This vertically oriented motor housing 43 is provided with a motor mount 44 at its bottom end so that cylinder 45 of a hydraulic motor 46 can be fixed to the housing 43 relative to the mast guide 13. The hydraulic motor's piston rod 47 is connected with an arm 49 fixed to the inside top end of the mast 14. Accordingly, and as the piston rod 47 is extended upwardly or retracted downwardly relative to the motor cylinder 45, the mast 14 is similarly extended upwardly or retracted downwardly within the mast guide 13. The hydraulic motors 46 carried within the mast guides 13 are connected with a hydraulic pump (not shown) and an electric control system (not shown) for that pump. It is the hydraulic circuit (not shown), through use of the electric controls, that allows the hydraulic motors 46 to raise or lower the cargo platform 15 when it is in the unfolded horizontal elevator position as well as when it is in the folded vertical storage position.

The motor housing 43 and first tubular support 38, i.e., the inner end surface 50 of the mast guides 13, are fixed to the rear end side wall edge 51 of the truck body 21. Thus, each mast guide 13 is fixed to one of the truck's side walls 22, as shown in FIG. 1. Adjacent to the outer end surface 37a of plate 37, the mast guide 13 carries spaced hinged plates 53 for each of the truck doors 25. Thus, a door 25 is mounted to each mast guide 13 on a vertical hinge line 26 defined by the hinge plates 53 as shown in FIG. 1.

The mast 14 slideably received in each mast guide 13 for each mast assembly 11, 12 is illustrated in FIGS. 1-4. The mast 14 is comprised of a vertical tubular member 55 with a pair of spaced rollers 41 connected to it, the rollers being adapted to ride in the mast guide's tracks 39, 42 as previously mentioned. Each roller 41 is carried on a stub axle 56, and rotates relative to that axle on needle bearings (not shown). Each roller 41 is connected to the mast 14 through use of a sleeve 58 fixed to the mast that receives the stub axle 56. The stub axle 56 is held in fixed position with the sleeve 58 by pin 59.

Figure 3:
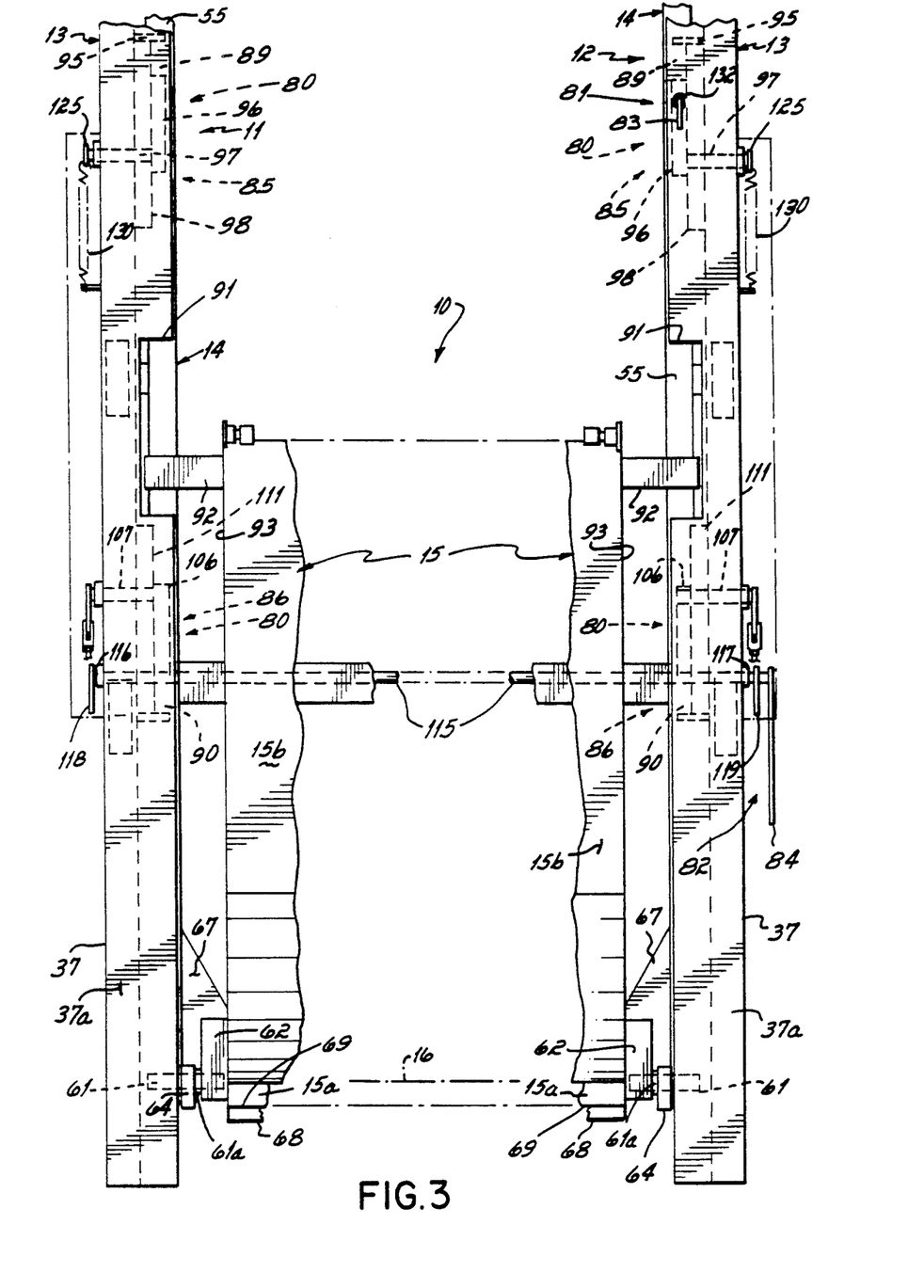
FIG. 3 is a rear view of the cargo platform system taken generally along line 3—3 of FIG. 2A.

The cargo platform 15, as seen in FIGS. 1, 2A and 3, includes primary section 15a pivotally connected on swing axis 16 to the bottom ends 17 of opposed masts 14 by opposed stub axles 61 fixed to that floor section 15a. Each stub axle 61 is fixed to axle block 62 mounted on a side of the floor section 15a, that stub axle being held in immobile assembly with that axle block. Each stub axle 61 is received in pivotable relation with a bearing block 64 fixed to the bottom end 17 of mast 14 (a washer 61a being interposed between the cargo platform's axle block 62 and the mast's bearing block 64) thereby mounting the cargo platform in pivotal relation with the masts 14.

The cargo platform 15, as earlier noted, is held in its horizontal elevator position by chains 18 on opposite sides of the cargo floor. The cargo platform 15 is comprised of the primary section 15a and a secondary section 15b which are pivotally connected one to the other on swing axis 15c. The platform sections 15a, 15b are foldable into sandwich configuration for storage along the swing axis 15c as shown in FIG. 2A with the secondary section 15b being located outboard of the primary section 15a when the cargo platform is in its vertical storage position shown in FIGS. 2B and 2C. The chains 18 allow the cargo platform 15 to be moved between the horizontal elevator position shown in FIG. and the vertical storage position shown in FIGS. 2B and 2C by means of a fold/unfold motor 70 pivotally connected as at 71 to a mast 14 at one end, and pivotally connected as at 72 at the other end to the cargo platform's primary section 15a. This fold/unfold motor 70 is a hydraulic motor comprised of piston cylinder 73 pivotally connected to the mast 14, and piston rod 74 pivotally connected to the platform section 15a. The fold/unfold motor 70 is connected to a hydraulic pump (not shown), and is controlled through use of electrical controls (not shown) for that pump, to swing the cargo platform between the horizontal elevator position shown in FIG. 1 and the vertical storage position shown in FIGS. 2B and 2C. This fold/unfold hydraulic motor 70 is separately controlled relative to the hydraulic motors 46 which raise and lower the masts 14 within the mast guides 13. Thus, and as is explained in further detail below, the masts 14 can be raised and lowered independently of, i.e., without operation of, the fold-/unfold motor 70. While a motor 70 operated fold/unfold structure has been shown for the cargo platform 15 in the embodiment illustrated, it will be understood that the fold/unfold motor simply can be eliminated so that the cargo platform also can be moved manually between the horizontal elevator and vertical storage positions. Also, it will be understood that the cargo platform 15 may be of an integral one piece or non-sectional platform configuration.

A safety tie bar 65 is connected between the masts 14 at their bottom ends. The safety tie bar 65 is located on that side of the platform swing axis 16 which is opposite to that side on which the platform 15 is located. A brace plate 67 reinforces the safety tie bar 65 connection to each mast 14. A safety lip 68 that extends along the cargo platform's truck edge 69 is adapted to interact with the safety tie bar 65 carried by the masts 14 so as to prevent the cargo platform 15 from swinging substantially downwardly beyond its horizontal elevator position shown in FIG. 1 if one or both the chains 18 break when the cargo platform is being used as an elevator. In other words, if the cargo platform 15 was to try to swing downwardly beyond the horizontal use position, the platform's safety lip 68 would interengage the masts, safety tie bar 65 so as to prevent the cargo platform from swinging any farther downwardly.

An automatic latch system 80 for each mast assembly 11, 12 permits the cargo platform 15 to be located in two different vertical storage positions relative to ground, compare the FIG. 2B storage position to the FIG. 2C storage position. Each of these automatic latch systems 80 is partially carried by mast guide 13 and is partially carried by the cargo platform 15. The automatic latch system 80 for each mast assembly 11, 12 allows the mast guides 13 and the folded cargo platform to be latched together so that substantially no relative movement therebetween is possible in an upper latch position when the folded cargo platform is in its vertical storage position and located in a first or upper storage location substantially entirely above the cargo floor 24 as illustrated in FIG. 2B. The automatic latch system 80 for each mast assembly 11, 12 also allows the mast guides 13 and the folded cargo platform 15 to be latched together so that substantially no relative movement therebetween is possible in a lower latch position when the folded cargo platform is in its vertical storage position and located in a second or lower storage location substantially entirely below the cargo floor 24 as illustrated in FIG. 2C. Further, the automatic latch system 80 of this invention also allows the folded cargo platform 15 and mast guides 13 to be latched together so that substantially no relative movement is possible between the mast guides and their respective masts in each of the upper and lower latch positions. The automatic latch system 80 of this invention operates in response to movement of the folded cargo platform 15 into each of the upper and lower storage locations, respectively, after the cargo platform has been folded and vertically oriented as explained in further detail below. In addition, the automatic latch system 80 includes a first latch release 81 located at an upper position relative to ground 36, and a second latch release 82 located at a lower position relative to ground. The folded cargo platform 15 can be released from its storage location at either of it supper and lower latch positions upon activation of only one such latch release 81 or 82. Each latch release 81, 82 includes a manual handle 83, 84, respectively, connected to it. The manual handle 83 for the upper latch release 81 is oriented at a location on a mast guide 13 so that a user standing on a dock or on the truck body's cargo floor 24 can use it. The manual handle 84 for the lower latch release 82 is also located on that same mast guide 13 so that a user standing on ground 36 can make use of it.

The automatic latch system 80 of this invention, more particularly, includes an upper latch assembly 85 mounted to each mast guide 13, and a lower latch assembly 86 mounted to each mast guide, see FIGS. 2A, 3, 5 and 6. The upper 85 and lower 86 latch assemblies mounted to each mast guide 13 cooperate with a guide rail 87 which is part of outer end plate 37a of the mast guide 13. This guide rail 87 extends along the length 88 of the mast guide 13 between the bolt cavities 89, 90 defined by the upper 85 and lower 86 latch assemblies, respectively. Each of the guide rails 87 also includes an access throat 91 located between the upper 89 and lower 90 bolt cavities, see FIG. 3. This access throat 91, and the upper 85 and lower 86 latch assemblies themselves, each cooperate with a latch bolt 92 fixed to and extending outboard from each side 93 of the cargo platform 15, see FIGS. 1 and 3. Specifically, these platform latch bolts 92 are fixed to and extend outwardly from the opposite sides 93 of the secondary platform section 15b. The guide rails, access throats 91 allow each of the platform's latch bolts 92 to be located between a guide rail 87 and a mast 14 when the cargo platform 15 is in the folded storage position, and before the cargo platform is moved upward or downward toward either its upper or lower storage location shown in FIGS. 2B and 2C, respectively. And the guide rails 87 further function to guide the platform's latch bolts 92 into the bolt cavities 89, 90 defined by the upper 85 and lower 86 latch assemblies as the cargo platform 15 moves toward either of its upper or lower storage location while the cargo platform is in its folded vertical storage position.

Figure 5:
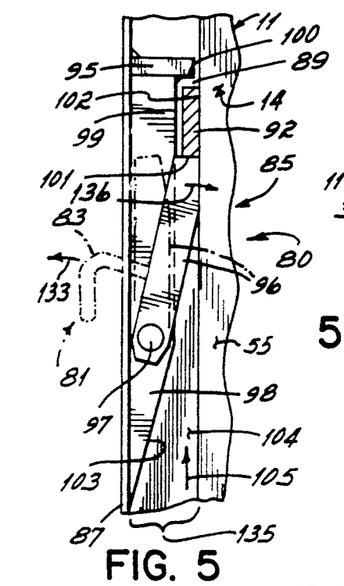
FIG. 5 is a cross-sectional view taken along line 5—5 of FIG. 4, same showing the details of an upper bolt cavity.

Each upper latch assembly 85, as shown particularly in FIGS. 3 and 5, includes an upper latch plate 96 mounted on pin 97 pivotally journalled to the mast guide 13. Thus, the upper latch plate 96 is swingable between a phantom line position shown in FIG. 5 which allows the cargo platform's latch bolt 92 to move into or out of the upper bolt cavity 89, and a solid line position shown in FIG. 5 where that latch plate 96 abuts the mast 14 to partially define that bolt cavity so as to capture the latch bolt 92 within that bolt cavity. The upper latch assembly 85 also includes the manually operable handle 83 (on the right hand mast assembly 12 only) connected to the upper latch plate. This manual handle 83 extends through the associated guide rail 87 which allows the upper latch plate 96 to be removed manually from latching relation with the cargo platform's latch bolt 92 so as to release that latch bolt from latching relation with the upper latch assembly 86 and, thereby, allow the cargo platform to be released from its upper storage location. The upper latch assembly 85 also includes an upper strike plate 95 fixed to the mast guide 13, and a latch bolt guide 98 fixed to the mast guide. The surface 99 of the latch bolt guide, the surface 100 of the upper strike plate, the surface edge 101 of the upper latch plate 96, and surface 102 of the movable mast 14 all cooperate to define the upper bolt cavity 89 for the cargo platform's latch bolt 92. The leading edge 103 of the latch bolt guide 98 is sloped so as to define an access throat 104 for the cargo platform's latch bolt 92 as it moves upwardly in the direction shown by phantom arrow 105 in FIG. 5 into latching relation with the pivotable upper latch plate 96.

Figure 6:
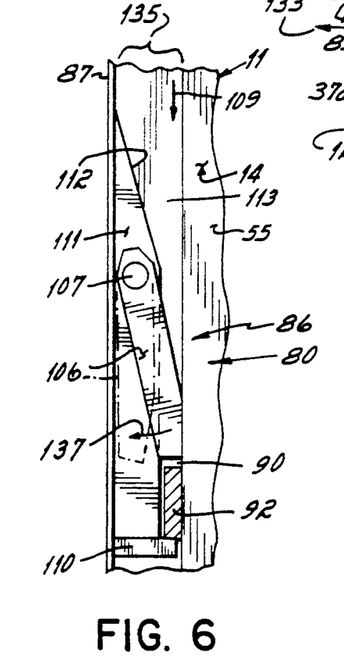
FIG. 6 is a cross-sectional view similar to FIG. 5 but showing details of a lower bolt cavity.

The lower latch assembly 86 associated with each mast assembly 11, 12 is illustrated in FIG. 6. The lower latch assembly 86 includes a pivotable latch plate 106 fixed on pin 107 that is pivotably journalled to mast guide 13. This lower latch plate 106 pivots into the phantom line position shown in FIG. 6 upon contact by the cargo platform's latch bolt 92 as it moves downwardly in the direction shown by phantom arrow 109 into the lower bolt cavity 90. The lower latch plate 106 then pivots back to the latch position shown in solid lines in FIG. 6 where it it abuts the mast 14 so as to prevent the platform's latch bolt 92 from escaping the lower bolt cavity 90. The lower latch assembly 86 also includes a strike plate 110 fixed to the mast guide 13, and a latch bolt guide 111 also fixed to the mast guide. The latch bolt guide 111 includes a sloped surface 112 which defines an entry throat 113 for the platform's latch bolt 92 as it proceeds in the direction shown by phantom arrow 109 when it is desired to latch the cargo platform in the lower storage location.

A latch release mechanism interconnects all of the two upper 85 and two lower 86 latch assemblies one with the other. The upper 85 and lower 86 latch assemblies on the left hand mast assembly 11 are interconnected with the upper and lower latch assemblies on the right hand mast assembly 12 through use of a tie rod 115, as shown in FIGS. 3 and 4. The tie rod 115, which is journalled to each mast guide 13 as shown at sleeves 116, 117 is connected with a bellcrank 118, 119 at each end. One arm 120 of each bellcrank 118, 119 is pivotally connected to a lower connector rod 121, the other end of that connector rod 121 being pivotally connected to a swing arm 122 fixed to the lower latch plate's pivot pin 107. The other arm 123 of each bellcrank 118, 119 is pivotally connected to an upper connector rod 124, the other end of that connector rod being pivotally connected to a swing arm 125 fixed to the upper latch plate's pivot pin 97. This bellcrank 118, 119, connector rod 121, 124, swing arm 122, 125 linkage, in combination with the tie rod 115 interconnects all of the first 85 and second 86 latch assemblies on each of the mast guides 13.

Accordingly, rotational motion of the bellcrank arms 118, 119 in the direction shown by arrow 126 results in both the upper 96 and lower 106 latch plates being swung open to the phantom line unlatch position shown in FIGS. 5 and 6, and rotational motion of the bellcrank arms in the direction shown by arrow 127 results in the upper 96 and lower 106 latch plates swinging closed into the solid line latch position shown in FIGS. 5 and 6.

A tension spring 130 is interconnected with each upper latch plate's swing arm 125 and the mast guide 13 to normally bias swing arm 125 in the direction shown by arrow 131 which results in the bellcrank arms 118, 119 being normally biased in the direction 127, see particularly in FIGS. 2A-C and 3. Accordingly, and as previously mentioned, when the bellcranks 118, 119 are so rotated in the direction 127, same causes the upper 96 and lower 106 latch plates to pivot to the solid line latch position illustrated in FIGS. 5 and 6. These spring 130 motors, therefor, result in the upper 96 and lower 106 latch plates being normally biased toward the bolt cavity defining latching positions.

The linkage 115, 118, 119, 121, 122, 124, 125 which connects both of the first or upper 85 and second or lower 86 latch assemblies is provided with manual operator handles 83, 84, one handle 84 being at the lower latch position (which is accessible to a user from ground 36 level) and one handle 83 being at the upper latch position (which is accessible to a user from a dock or the truck body's cargo floor 24), see FIGS. 2A–C and 3. The lower operator handle 84 is fixed to the tie rod 115 only adjacent the right mast assembly 12, and is adapted to rotate the bellcrank arm 119 in the direction 126 when manual release of the upper 96 and lower 106 latch plates from the bolt cavities 89, 90 is desired. Further, the upper operator handle 83, which again is provided only adjacent the right mast assembly 12, is simply a handle fixed directly to the latch plate 96 itself as shown in FIG. 5 which extends out through a slot 132 formed in the guide rail 87 as shown in FIG. 1 When this upper operator handle 83 is pulled outwardly in the direction shown by arrow 133, the upper latch plate 96 is released from the upper bolt cavity 89 shown in FIG. 5 and, through the connector rods 124, 124 the lower latch plate 106 also is automatically released from its bolt cavity 90 shown in FIG. 6 When either the lower latch release handle 84 or the upper latch release handle 83 is released from manual operation, then the tension springs 130 cause the upper 96 and lower 106 latch plates to return automatically to the latch positions shown in solid lines in FIGS. 5 and 6. As previously noted, operation of the upper 96 and lower 106 latch plates on the right hand mast assembly 12 through use of upper 83 and lower 84 latch release handles is transmitted to the upper and lower latch plates which serve the left hand mast assembly 11 through the tie rod 115 which extends beneath the cargo platform floor 24.

Use of the cargo platform system of this invention is particularly illustrated in FIGS. 1, 2A–C and 3. FIG. 1 illustrates use of the cargo platform in the horizontal elevator position. In this attitude, the two platform sections 15a, 15b are unfolded relative one to the other so that a single length elevator platform is provided, which platform is held in the horizontal attitude by chains 18. In this horizontal elevator position, and as the masts 14 are raised and lowered relative to the mast guides 13 by the hydraulic motors 35, the cargo platform 15 is raised and lowered between ground 36 and the truck body's cargo floor 24 for loading or unloading the truck body 21.

When it is desired to store the cargo platform 15, and whether the platform is to be stored in the upper storage location illustrated in FIG. 2B or the lower storage location illustrated in FIG. 2C, the first step is to fold the cargo platform sections 15a, 15b one on top the other in sandwich configuration. In order to effect this folding step, the platform's fold/unfold motor 70 is activated so that piston rod 74 is drawn inwardly of the motor cylinder 73. This causes the primary platform section 15a to pivot upwardly on pivot axis 16 toward the vertical position, see FIGS. 1 and 2A. This, in turn, allows the secondary platform section 15b to fold downwardly on pivot axis 15c, the chain posts 19 cooperating with chains 18 to ensure the downward folding action of the secondary platform section 15b as the primary platform 15a is folded upwardly. During this folding/unfolding step of the platform sections 15a, 15b the cargo platform 15 is raised or lowered relative to ground 36 so that the platform's latch bolts 92 will be in register with the access throats 91 of the mast guides' guide rails 87 when the folded platform is in the vertical storage position, see FIG. 3. Now in the vertical storage position, and with the platform's latch bolts 92 located interiorly of the guideway area 135 defined between the guide rails 87 and the masts 14, the cargo platform is adapted to be moved upwardly or moved downwardly until the platform's bolts 92 interengage with either the upper latch assembly 85 or the lower latch assembly 86.

If the next delivery site or pick up site is a substantial distance away, and in order to minimize air drag on the truck and enhance gasoline mileage, it may be desired to store the folded cargo platform 15 in an upper position where it is substantially entirely located above the truck bed level as illustrated in FIGS. 2B and 5. If this storage position is desired, first the cargo platform 15 must be folded and pivoted into the vertical storage position from the horizontal elevator position with the platform's latch bolt 92 interposed in the guideway area 135 defined between the guide rail 87 and the mast 14 relative to each mast assembly 11, 12. Then the so-oriented and folded cargo platform 15 is upraised by the mast motors 46 of the motor system 35. As the folded cargo platform 15 is upraised, the upper latch assembly's latch bolt guides 98 function to guide the cargo platform's latch bolts 92 past the upper latch plates 96. As the cargo platform's latch bolts 92 interengage the upper latch plates 96, same pivot toward the phantom line position illustrated in FIG. 5 until the cargo platform's latch bolts fully enter the upper latch assembly's bolt cavities 89. When the FIG. 5 solid line position of the cargo platform's latch bolts 92 is achieved, then the upper latch plates 96 automatically swing in the direction illustrated by arrow 136 as continually biased by springs 130 so as to close those upper bolt cavities 89 and entrap the cargo platform's latch bolts 92 therein. In this final upper storage position, which is illustrated in FIGS. 2B and 5, the folded cargo platform 15 is prevented from pivoting on its pivot axis 16, and the secondary platform section 15b is prevented from pivoting on its pivot axis 15c, as well as from moving upwardly or downwardly relative to the truck body's floor 24, as the truck travels over the road.

When it is desired to store the folded cargo platform 15 beneath the truck body's cargo floor 24, such as may be desired if the truck's next delivery or pickup site is not far away, then the lower latch assemblies 86 would be used, see FIGS. 2C and 6. In this alternative use situation, and with the cargo platform's latch bolts 92 interposed in the guide way 135 defined by the guide rail 87 and the masts 14 of each mast assembly 11, 12, the folded cargo platform 15 is thereafter lowered by use of the mast motors 35 to move the masts 14 downward relative to the mast guides 13. The cargo platform 15 is so moved downward until the cargo platform's latch bolts 92 interengage the slope 112 of latch bolt guides 111 fixed in place on the mast guides 13 which serve to direct the cargo platform's latch bolts into the lower latch cavities 90. As the cargo platform 15 is lowered, the cargo platform's latch bolts 92 bias the lower latch plates 106 in a direction shown by arrow 137 so as to achieve access into the lower bolt cavities 90 which are then closed by the lower latch plates 106 which swing back against the masts 14 as urged by springs 130 through the latch plate linkage 115, 118, 119, 121, 122, 124, 125 associated with each of the mast assemblies 11, 12. In this lower latching attitude, which is illustrated in FIGS. 2C and 6, the cargo platform's latch bolts 92 are supported, and therefor the cargo platform 15 itself is supported, by the lower latch assemblies+ lower strike plates 110. Of course the cargo platform 15 is prevented from pivoting on axes 16 and 15c as described above and cannot move up or out of those lower latch assemblies 86 until the lower latch plates 106 are released from the solid line latch position illustrated in FIG. 6.

When the truck reaches the next delivery or pickup site, and when it is desired to make use of the stored cargo platform 15 once again, the first step is to release either the upper 96 or lower 106 latch plates from latching relation with the cargo platform's latch bolts 92 depending on whether the cargo platform is stored at the upper (see FIG. 2B) or lower (see FIG. 2C) latch positions. This can be achieved by the truck's driver if he is standing on the ground simply by use of lower manual latch release handle 84. This also can be achieved by the truck's driver if he is standing on a loading dock or the truck's cargo floor 24 simply by use of the upper manual latch release handle 83. And use of either the upper manual release handle 83 or the lower manual release handle 84 will function to move both the upper latch plate 96 and the lower latch plate 106 of each mast assembly 11, 12 from the solid line latch position illustrated in FIGS. 2B, 2C, 5 and 6 to the phantom line unlatch positions illustrated in FIGS. 5 and 6. For example, and if the truck's driver is standing on the truck's cargo floor 24, whether the cargo platform 15 is latched in the upper over-the-road storage position illustrated in FIG. 2B or the bottom in-town storage position illustrated in FIG. 2C, the truck's driver need merely pull the linkage release handle 83 adjacent the right hand mast assembly 12 in the direction illustrated by arrow 133. This pivots the upper latch plates 96 toward the phantom line release position illustrated in FIG. 5, and simultaneously (because of the linkage which includes upper connector rod 124, bellcrank arms 118, 119, lower connector rod 121 and tie rod 115) also pivots the lower latch plate 106 into the phantom line release position. Thereafter, and through use of the masts' motors 46, the masts 14 either can be moved downwardly (if the cargo platform 15 has been stored in the upper storage location), or can be moved upwardly (if the cargo platform has been stored in the lower storage location), so that the platform's latch bolts 92 are moved out of the upper bolt cavity 89 or the lower bolt cavity 90, respectively. Similarly, and if the truck's driver is standing on ground 26, he can simply use the lower latch release handle 84 by pulling same in the direction illustrated by arrow 126. This causes bellcrank arms 118, 119 to pivot in the direction shown by arrow 126 which, in turn, through the connector rods 124, 121 causes the upper latch plates 96 to pivot toward the phantom line FIG. 5 position and the lower latch plates 106 to pivot toward the phantom line FIG. 6 position. Thereafter, and again through use of the masts' motors 46, the masts 14 and accordingly the folded cargo platform, can be moved downwardly or upwardly, respectively, so that the cargo platform's latch bolts 92 are removed from either the upper bolt cavities 89 or the lower bolt cavities 90.

Now with the cargo platform's latch bolts removed from the upper 89 or lower 90 bolt cavities, as the case may be, the mast assemblies' masts 14, as driven by the mast motors 46, are either lowered or raised as required, until the cargo platform's latch bolts 92 are oriented adjacent the access mouths 91 of the guide rails 87 fixed to the mast guides 13, as shown in FIG. 3. With the cargo platform s latch bolts 92 oriented for ingress or egress through the guide rails' access mouths 91, i.e., into or out of the guide ways 135 formed between each mast assembly's guide rail 87 and mast 14, the cargo platform's fold/unfold motor 70 is thereafter activated so as to unfold the cargo platform from its vertical storage position illustrated in FIGS. 3 and 4 toward the horizontal elevator position illustrated in FIG. 1. The fold/unfold motor 70 simply pivots the cargo platform section 15a outwardly along pivot axis 16 into an intermediate folding/unfolding position illustrated in FIG. 2A, and further thereafter until that primary platform section 15a is disposed horizontally relative to ground. As the cargo platform's sections 15a, 15b are unfolded, the chains 18 and chain posts 19 cause the secondary section 15b to pivot on its axis 15c with the primary section 15a until those sections are co-planar one with the other as illustrated in FIG. 1.

Having described in detail the preferred embodiment of my invention, what I desire to claim and protect by Letters Patent is:

1. A cargo platform system for use with a cargo floor elevated above ground, said assembly comprising
   a mast assembly having a mast guide and a mast movably supported by said guide,
   a cargo platform pivotally connected to said mast, said cargo platform being swingable relative to said mast between a horizontal elevator position and a vertical storage position,
   a motor mechanism connected with said mast for moving said mast relative to said mast guide in order to operate said cargo platform as an elevator between said cargo floor and ground,
   a first storage latch component on said cargo platform and a second storage latch component on said mast guide, said second component being located at an upper level relative to ground to establish an upper latch position, said first and second components being automatically latchingly engageable one with the other in response to raising said cargo platform from a low position relative to said second component until said first component latchingly engages automatically with said second component at said upper latch position, there being substantially no relative movement between said platform and said mast guide when said platform and said mast guide are latched together in said upper latch position, and
   a third storage latch component on said mast guide, said third component being located at a lower level relative to ground to establish a lower latch position, said first and third components being automatically latchingly engageable one with the other in response to lowering said cargo platform from a high position relative to said third component until said first component latchingly engages automatically with said third component at said lower latch position, there being substantially no relative movement between said platform and said mast guide when said platform and said mast guide are latched together in said lower latch position,
   thereby allowing a user to effect automatically one of two separate upper and lower latch positions for said cargo platform in order to locate said cargo platform in a storage position by one of raising and lowering said cargo platform as selected by said user.

2. A cargo platform system as claimed in claim 1, said cargo platform being oriented in said vertical storage position prior to movement of said cargo platform into each of said upper and lower storage locations.

3. A cargo platform system as claimed in claim 1, said system comprising at least one of a first latch release located at an upper position relative to ground and a second latch release located at a lower position relative to ground, said first latch release being connected to said second latch component and said second latch release being connected to said third latch component, said cargo platform being releasable from its storage location at either of said upper and lower latch positions upon activation of said one latch release.

4. A cargo platform system as claimed in claim 1, said system comprising a first latch release connected to said second latch component, said first latch release being located at a position where it is accessible to a user standing at an elevated level above ground, a second latch release connected to said third latch component, said second latch release being located at a position where it is accessible to a user standing at ground level, said cargo platform being releasable from that selected one of said upper and lower latch positions where said cargo platform is stored by activating a selected one of said first and second latch releases.

5. A cargo platform system as claimed in claim 4, said system comprising a manual handle connected to each of said first and second latch releases.

6. A cargo platform system as claimed in claim 4, said first latch component comprising a latch bolt connected to said cargo platform, and said second and third latch components each comprising a bolt cavity partially defined by said mast guide at each of said upper and lower latch positions, said latch bolt being located in said bolt cavity at each of said upper and lower storage locations.

7. A cargo platform system as claimed in claim 6, said second and third latch components each comprising a strike plate and a pivotable latch plate that partially defines said bolt cavity, each of said strike and latch plates being connected to said mast guide, and a spring connected with said pivotable latch plate, said spring continuously biasing said latch plate into a position that partially defines said bolt cavity, said latch bolt biasing said latch plate out of said bolt cavity defining position when said cargo platform is in said vertical storage position as it is moved toward a storage location.

8. A cargo platform system as claimed in claim 7, said second and third latch components each comprising a beveled latch bolt guide fixed to said mast guide at said bolt cavity, each beveled guide being adapted to direct said latch bolt into its associated bolt cavity, and each bolt cavity being defined by said mast, said mast guide, said strike plate and said pivotable latch plate.

9. A cargo platform system as claimed in claim 4, said second and third latch components comprising a linkage that interconnects said second storage latch component with said third storage latch component so that both said second and said third components are released simultaneously upon activation of only one of said first and second latch releases, said cargo platform being released from either of said upper latch position and said lower latch position upon activation of either one of said first latch release and said second latch release, thereby allowing said cargo platform to be released by a user located either at said elevated level above ground or at said ground level regardless of whether said cargo platform is latched in said upper latch position of said lower latch position.

10. A cargo platform system as claimed in claim 4, said system comprising a guide rail fixed to said mast guide, said guide rail extending along the length of said mast guide between said upper and lower latch positions, said first latch component being guided by said guide rail into latching relation with one of said second and third latch components as said cargo platform moves toward either of its upper and lower latch positions while said cargo platform is in said vertical storage position.

11. A cargo platform system as claimed in claim 10, said guide rail comprising an access throat defined in said guide rail, said access throat allowing said first latch component to be located between said guide rail and said mast before said cargo platform is moved either upwardly or downwardly toward either its upper or lower latch position, respectively.

12. A cargo platform system for use with a cargo floor elevated above ground, said system comprising a mast assembly having a mast guide and a mast movably supported by said guide, a cargo platform having a primary platform section pivotally connected to said mast and a secondary platform section, said pivotally connected to said primary section, said cargo platform being swingable relative to said mast between a horizontal elevator position where said primary and secondary sections are unfolded into platform use configuration, and a vertical position where said primary and secondary sections are folded into sandwich configuration, a motor mechanism connected with said mast for moving said mast relative to said mast guide in order to operate said cargo platform as an elevator between said cargo floor and ground, and a first storage latch component on said secondary platform section and a second storage latch component on said mast guide, said first and second latch components cooperating to latch said secondary platform section directly to said mast guide so that both said primary and secondary platform sections are held folded together, and are held substantially immobile, in a storage position when said cargo platform is in said vertical position, said first and second storage latch components being automatically engaged one with the other as said folded cargo platform is moved into said storage position.

13. A cargo platform system as claimed in claim 12, said secondary platform section being folded outboard of said primary platform section when in said sandwich configuration.

14. A cargo platform system as claimed in claim 12, said cargo platform being in said vertical position prior to movement of said cargo platform into said storage position.

15. A cargo platform system for use with a cargo floor elevated above ground, said assembly comprising
   a mast assembly having a mast guide and a mast movably supported by said guide,
   a cargo platform pivotally connected to said mast, said cargo platform being swingable relative to said mast between a horizontal elevator position and a vertical storage position,
   a motor mechanism connected with said mast for moving said mast relative to said mast guide in order to operate said cargo platform as an elevator between said cargo floor and ground, and
   an automatic latch system partially carried by said mast guide and partially carried by said platform, said automatic latch system allowing said platform and said mast guide to be latched together when said platform is in said vertical storage positions so that substantially no relative movement is possible between said platform and said mast guide, said latch system being structured so that said platform is automatically latched to said mast guide in response to movement of said cargo platform into a storage location, said automatic latch system comprising
   a latch bolt connected to said cargo platform,
   a strike plate and a pivotable latch plate that partially defines a bolt cavity, each of said strike and latch plates being connected to said mast guide,
   a spring connected with said pivotable latch plate, said spring continuously biasing said latch plate into a position that partially defines said bolt cavity, said latch bolt biasing said latch plate out of said bolt cavity defining position when said cargo platform is in said storage position as it is moved toward said storage location, said cargo platform being in said vertical storage position prior to movement of said cargo platform into said storage location, and
   a guide rail fixed to said mast guide, said guide rail extending along the length of said mast guide, said latch bolt being guided by said guide rail into said bolt cavity as said cargo platform moves toward its storage location while said cargo platform is in said vertical storage position.

16. A cargo platform system as claimed in claim 15, said automatic latch system comprising
   a latch release connected with said latch plate, said cargo platform being releasable from its storage location upon activation of said latch release.

17. A cargo platform system as claimed in claim 16, said automatic latch system comprising
   a manual handle connected to said latch release.

18. A cargo platform system as claimed in claim 15, said guide rail comprising
   an access throat that allows said latch bolt to be located between said guide rail and said mast before said cargo platform is moved toward its storage position.

19. A method of storing a cargo platform relative to a truck body's cargo opening, said cargo platform being pivotally connected to a mast movably supported by a mast guide fixed to said truck body, said cargo platform being swingable relative to said mast between an elevator position and a storage position, said method comprising the steps of
   providing a cargo platform having a primary platform section pivotally connected to said mast and a secondary platform section pivotally connected to said primary section, said cargo platform being swingable relative to said mast between a horizontal position where said primary and secondary sections are unfolded into platform use configuration, and a vertical position where said primary and secondary sections are folded into sandwich configuration,
   folding said secondary platform section outboard of said primary platform section when in said sandwich configuration, said primary platform section thereby being interposed between said secondary platform section and said mast assembly when said cargo platform is in said vertical position,
   providing a first storage latch component on said secondary platform section and a second storage latch component on said mast guide, said first and second latch components cooperating to latch said secondary platform section directly to said mast guide so that both said primary and secondary platform sections are held immobile in a storage position when said cargo platform is in said vertical position, and
   automatically latching said first and second latch components together, and therefore said mast guide directly with said secondary platform section, in said storage position when said cargo platform is folded and in said vertical position by moving said cargo platform from said horizontal use position into said storage position.

20. A method as claimed in claim 19, said method comprising the steps of
   orienting said cargo platform into said vertical position prior to movement of said cargo platform into said storage position.

21. A cargo platform system for use with a cargo floor elevated above ground, said assembly comprising
   a mast assembly having a mast guide and a mast movably supported by said guide,
   a cargo platform pivotally connected to said mast, said cargo platform being swingable relative to said mast between a horizontal elevator position and a vertical storage position,
   a motor mechanism connected with said mast for moving said mast relative to said mast guide in order to operate said cargo platform as an elevator between said cargo floor and ground, and
   an automatic latch system partially carried by said mast guide and partially carried by said platform, said automatic latch system allowing said platform and said mast guide to be latched together when said platform is in said vertical storage positions so that substantially no relative movement is possible between said platform and said mast guide, said latch system being structured so that said platform is automatically latched to said mast guide in response to movement of said cargo platform into a storage location, said automatic latch system comprising
   a latch bolt connected to said cargo platform,
   a strike plate and a pivotable latch plate that partially defines a bolt cavity, each of said strike and latch plates being connected to said mast guide, a spring connected with said pivotable latch plate, said spring continuously biasing said latch plate into a position that partially defines said bolt cavity, said latch bolt biasing said latch plate out of said bolt cavity defining position when said cargo platform is in said storage position as it is moved toward said storage location, and a beveled latch bolt guide fixed to said mast guide at said bolt cavity, said beveled guide being adapted to direct said latch bolt into said bolt cavity, and said bolt cavity being defined by said mast, said mast guide, said strike plate and said pivotable latch plate.

22. A method of storing a cargo platform relative to a truck body's cargo opening, said cargo platform being pivotally connected to a mast movably supported by a mast guide fixed to said truck body, said cargo platform being swingable relative to said mast between an elevator use position and a vertical storage position, said method comprising the steps of automatically latching said platform to said mast guide in an upper latch position so that substantially no relative movement between said platform and said mast guide is possible, said latching being achieved by raising said cargo platform from a low position relative to ground to interengage with an upper latch on said mast guide, and automatically latching said platform to said mast guide in a lower latch position so that substantially no relative movement between said platform and said mast guide is possible, said latching being achieved by lowering said cargo platform from a high position relative to ground to interengage with a lower latch on said mast guide, thereby allowing a user to said truck body to effect automatically one of two separate upper and lower latch positions for said cargo platform when said cargo platform is in said storage position by one of raising and lowering said cargo platform as selected by said user.

23. A method as claimed in claim 22, said method comprising the steps of connecting a first latch release with said upper latch, said first latch release being located at a position where it is accessible to a user standing at an elevated level above ground equivalent to the height of the truck body's floor above ground, connecting a second latch release with said lower latch, said second latch release being located at a position where it is accessible to a user standing at ground level, and releasing said cargo platform from that selected one of said upper and lower latch positions where said cargo platform is stored by activating a selected one of said first and second latch releases.

24. A method as claimed in claim 23, said method comprising the step of interconnecting said upper latch with said lower latch so that both said upper latch and said lower latch are released simultaneously upon activation of only one of said first and second latch releases, thereby allowing said cargo platform to be released from either of said upper latch and said lower latch upon activation of either one of said first latch release and said second latch release which allows said cargo platform to be released by a user located either at said elevated level above ground or at said ground level regardless of whether said cargo platform is latched in said upper latch position or said lower latch position.

* * * * *

UNITED STATES PATENT AND TRADEMARK OFFICE
CERTIFICATE OF CORRECTION

PATENT NO. : 5,263,808
DATED : November 23, 1993
INVENTOR(S) : Douglas H. Kent

It is certified that error appears in the above-indentified patent and that said Letters Patent is hereby corrected as shown below:

At Col. 4, line 26 after "Fig." please add -- 1 --.

At Col. 5, line 57 after "Fig." please add -- 1 --.

At Col. 8, line 20 please delete -- it --. (second occurrence)

At Col. 11, line 7 please delete "assemblies +" and insert --assemblies'--.

Signed and Sealed this

Thirtieth Day of August, 1994

Attest:

BRUCE LEHMAN

Attesting Officer

Commissioner of Patents and Trademarks